(12) United States Patent
Sheu et al.

(10) Patent No.: US 8,441,446 B2
(45) Date of Patent: May 14, 2013

(54) WIRELESS INPUT DEVICE INTEGRABLE WITH MOBILE DEVICE

(75) Inventors: Uen-Hour Sheu, New Taipei (TW); Chi-Te Huang, New Taipei (TW)

(73) Assignee: Ortek Technology, Inc., New Taipei (TW)

( * ) Notice: Subject to any disclaimer, the term of this patent is extended or adjusted under 35 U.S.C. 154(b) by 83 days.

(21) Appl. No.: 13/137,088

(22) Filed: Jul. 20, 2011

(65) Prior Publication Data
US 2012/0313855 A1 Dec. 13, 2012

(30) Foreign Application Priority Data
Jun. 10, 2011 (TW) .............................. 100120523 A (51) Int. Cl.
*G06F 3/02* (2006.01)
*G09G 5/00* (2006.01)

(52) U.S. Cl.
USPC ........................................................ 345/168

(58) Field of Classification Search ........................ None
See application file for complete search history.

(56) References Cited

U.S. PATENT DOCUMENTS

| 2008/0180892 A1* | 7/2008 | Lai ................................ 361/680 |
| 2009/0111508 A1* | 4/2009 | Yeh et al. ................... 455/552.1 |
| 2011/0199718 A1* | 8/2011 | Stone et al. .............. 361/679.01 |

* cited by examiner

*Primary Examiner* — Joseph Haley
*Assistant Examiner* — Nicholas Lee
(74) *Attorney, Agent, or Firm* — Bacon & Thomas, PLLC (57) ABSTRACT

A wireless input device integrable with a mobile device which includes a wireless keyboard, a carrier and a retracting plate. The wireless keyboard has a top surface provided with a plurality of keys and two opposite sides each provided with a first rail element. The carrier has a top surface concavely provided with a receiving cavity so that the mobile device can be placed and secured in position in the receiving cavity. The retracting plate is movably embedded in a bottom surface of the carrier, and provided with a second rail element at each of two opposite positions for engaging with the first rail elements respectively, so that both the carrier and retracting plate are movable along the rail elements to a position where the wireless keyboard is completely covered by the carrier or where all the keys are exposed outside the carrier.

2 Claims, 6 Drawing Sheets

WIRELESS INPUT DEVICE INTEGRABLE WITH MOBILE DEVICE

FIELD OF THE INVENTION

The present invention relates to a wireless input device integrable with a mobile device, more particularly to a wireless input device having a carrier and a wireless keyboard, wherein the carrier has a top surface concavely provided with a receiving cavity, the receiving cavity corresponds in configuration to the mobile device so that the mobile device can be placed and secured in position in the receiving cavity, and a bottom surface of the carrier is movably connected with the wireless keyboard so that the carrier can be moved along the wireless keyboard to a position where the carrier is located above and entirely covers the wireless keyboard or where all keys of the wireless keyboard are exposed outside the carrier.

BACKGROUND OF THE INVENTION

Recently, with the advancement of microcomputer technology and the rapid development of the electronic industry, a great variety of mobile devices have been developed and made commercially available, including personal digital assistants (PDAs), smart phones, and tablet PCs, to name only a few. These mobile devices typically are refined in structure, exquisite in appearance, and highly portable, and have therefore become one of the most popular products on the market. In order to reduce the space occupied by such a mobile device and make it possible to use such a device anytime anywhere, this kind of devices are usually as large as a user's hand or shaped as a panel the size of a notebook.

Now, thanks to the burgeoning touch control technology, touch screens are extensively used in mobile devices so that the conventional keyboards can be dispensed with to produce an even more polished look. Please refer to FIG. 1 for a mobile device 1 that is commonly seen nowadays. The mobile device 1 has a touch screen 10 and is operated as follows. Basically, a user can give all sorts of commands to the mobile device 1 (e.g., to execute a program, to adjust acoustic volume, etc.) by touching the touch screen 10 with a finger or a touch control input device (e.g., a stylus). When it is desired to input text into the mobile device 1, the mobile device 1 can be instructed to display a graphical keyboard 101 on the touch screen 10, wherein the graphical keyboard 101 is composed of a plurality of graphical keys 101a. By pressing any of such on-screen keys 101a, the touch screen 10 is triggered to send a corresponding command to the mobile device 1. The touch control operation described above not only is intuitive and user-friendly, but also eliminates the noise which may otherwise result from using a conventional keyboard to input text. Moreover, using the virtual keyboard 101 instead of a physical keyboard reduces the weight of the mobile device 1 significantly, which in turn increases convenience of use. However, such operation still has the following shortcomings:

(1) Difficulty in inputting commands accurately: As the mobile device 1 is generally designed to correspond in size to a pocket or a hand for enhanced portability, the area of the touch screen 10 is quite limited. It follows that the size of each graphical key 101a is also limited and seldom matches the size of a finger tip. Therefore, when the user presses a certain graphical key 101a, chances are the graphical keys 101a adjacent to the intended key are also pressed, thus leading to an incorrect or inaccurate input. Furthermore, unlike the conventional keyboards, the graphical keyboard 101 when pressed does not create a depressed feel to the user's finger, and absence of the such a depressed feel is very likely to be mistaken by the user as the mobile device 1's failure to sense the pressing action. As a result, the user tends to input the same command repeatedly and yet unnecessarily.

(2) Reduced display area on the touch screen: The fast development of network technology has made it commonplace for the mobile device 1 to have Internet connection functions, and it is often required to input text while using the mobile device 1 to browse webpages (e.g., to leave a message on a webpage, to input keywords in search for a specific website, etc.). During the webpage browsing process, however, the graphical keyboard 101 inevitably covers a significant portion of the display area on the touch screen 10 and thus causes inconvenience to the viewer.

Figure 1:
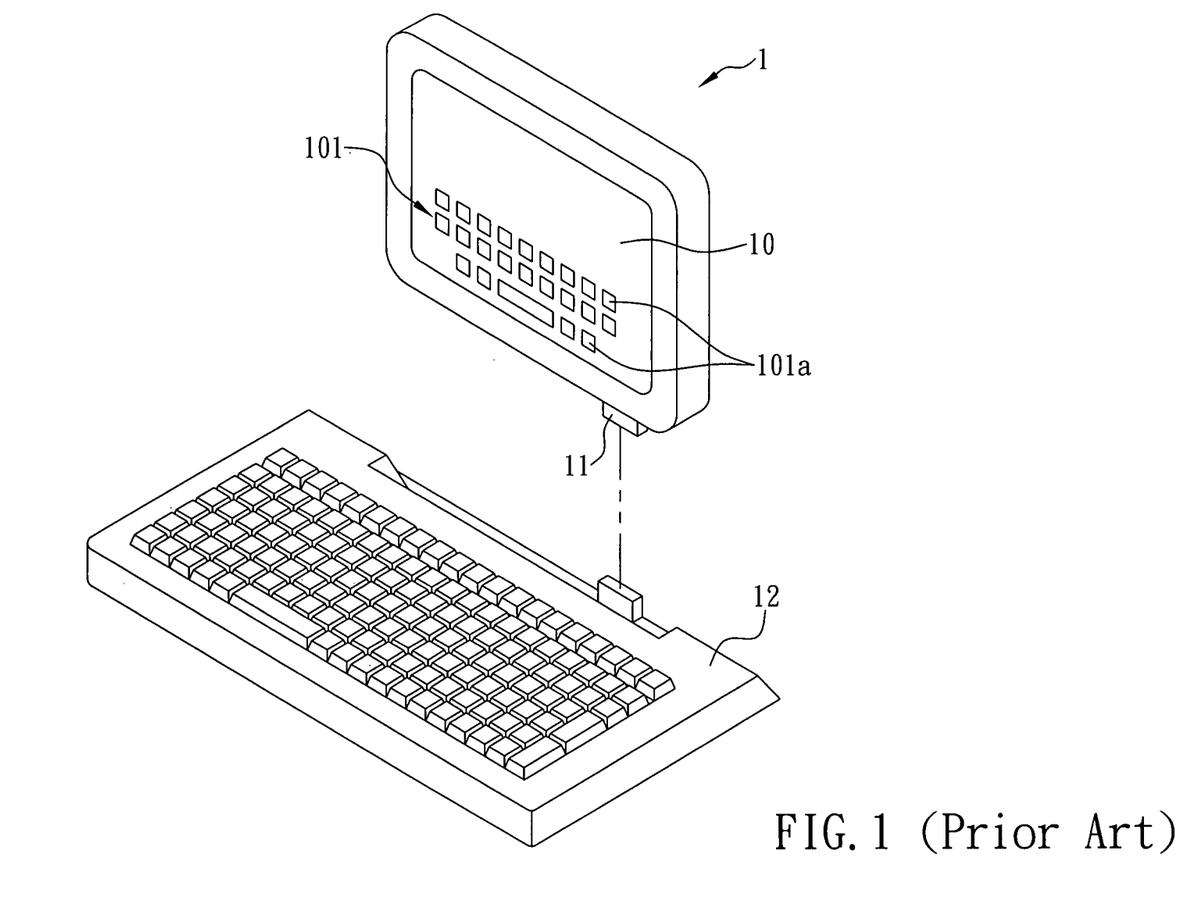
FIG. 1 is a perspective view of a mobile device and an auxiliary keyboard in the prior art.

As a solution to the aforesaid problems, the mobile device 1 can be additionally provided with a connector 11, as shown in FIG. 1, for connecting with an auxiliary keyboard 12 when it is desired to input text into the mobile device 1. The auxiliary keyboard 12, though capable of facilitating text input, compromises the portability of the mobile device 1. Besides, the auxiliary keyboard 12 must be placed on a flat surface (e.g., a tabletop) when used for input; in other words, the mobility of the mobile device 1 will be impaired. Therefore, the issue to be addressed by the present invention is to design an input device that can be used to input commands into a mobile device both accurately and conveniently.

BRIEF SUMMARY OF THE INVENTION

In view of the aforementioned inconveniences of using a mobile device in lack of a user-friendly input tool, the inventor of the present invention conducted extensive research and repeated trials and finally succeeded in developing a wireless input device that can be integrated with a mobile device and serve as a practical alternative to the existing input means.

It is an object of the present invention to provide a wireless input device integrable with a mobile device, wherein the wireless input device is designed for use with the mobile device and includes a wireless keyboard, a carrier, and a retracting plate. The wireless keyboard is configured for connecting with the mobile device in a wireless manner (e.g., via Bluetooth transmission). A plurality of keys are provided on a top surface of the wireless keyboard, and a parallel pair of first rail elements are provided on two opposite ends of the wireless keyboard respectively. The carrier has a top surface concavely provided with a receiving cavity. The receiving cavity corresponds in configuration to the mobile device so that the mobile device can be placed and secured in position in the receiving cavity. The retracting plate has two second rail elements provided at two opposite positions on the retracting plate respectively. The second rail elements correspond in configuration to the first rail elements and are engaged therewith respectively to thereby position the retracting plate on the wireless keyboard. The retracting plate can be movably embedded in a bottom surface of the carrier, so as for the carrier and the retracting plate to move along the rail elements to a position where the carrier is located above and entirely covers the wireless keyboard or to a position where all the keys are exposed outside the carrier. Once the mobile device is placed and secured in position in the receiving cavity and hence connected with the carrier, the user can embed the retracting plate into the bottom surface of the carrier and push the carrier on one side so that all the keys of the wireless keyboard are exposed outside the carrier. Then, the user can input commands by pressing the keys, and the wireless keyboard will transmit the commands to the mobile device wirelessly. As soon as the commands are input, the user can cover the wireless keyboard up with the carrier simply by pushing the carrier toward the wireless keyboard. The retracting plate and the wireless keyboard can also be detached from the bottom surface of the carrier so that the different units can be carried around separately in a spatially efficient manner (e.g., with the carrier and the mobile device received therein being put in a pocket, and the wireless keyboard and the retracting plate connected thereto being stored in a backpack).

Another object of the present invention is to provide the foregoing wireless input device, wherein the retracting plate further has at least one resilient element. Each resilient element has a first end connected to the retracting plate and a second end fixed to the wireless keyboard at a position away from the keys. When the wireless keyboard is completely covered by the carrier, the first end of each resilient element applies a retracting force to the retracting plate, thereby keeping the carrier in a state in which it covers the wireless keyboard completely. When the carrier has been pushed in such a way that all the keys of the wireless keyboard are located to one side of the carrier and hence exposed, the first end of each resilient element applies an opening force to the retracting force and thereby keeps the carrier in a state in which all the keys of the wireless keyboard are located to one side of the carrier and exposed. In the course where the carrier and the retracting plate are moved along the rail elements, each resilient element enters a critical state when its first and second ends are aligned along the same horizontal line. Depending on the direction in which the first end of each resilient element is subsequently moved with respect to the horizontal line, each resilient element applies a retracting or opening force to the retracting plate so that the carrier is driven to either cover the wireless keyboard entirely or allow all the keys of the wireless keyboard to be located to one side of the carrier and exposed.

Still another object of the present invention is to provide the foregoing wireless input device, wherein the periphery of the retracting plate is formed with at least one projection, and the bottom surface of the carrier is concavely provided with a recessed portion. The recessed portion corresponds in configuration to the retracting plate so as to receive the retracting plate. In addition, the recessed portion has a positioning slot corresponding in position to each projection so that the retracting plate, once positioned in the recessed portion, can be displaced therein to drive each projection away from the corresponding positioning slot and into engagement with an inner wall of the recessed portion, thereby embedding the retracting plate into the bottom surface of the carrier. Afterward, the user only has to push the retracting plate, causing each projection to move toward the corresponding positioning slot, and each projection will be disengaged from the inner wall of the recessed portion. Thus, the retracting plate can be readily removed from the bottom surface of the carrier.

BRIEF DESCRIPTION OF THE SEVERAL VIEWS OF THE DRAWINGS

The structure as well as a preferred mode of use, further objects, and advantages of the present invention will be best understood by referring to the following detailed description of an illustrative embodiment in conjunction with the accompanying drawings, in which.

DETAILED DESCRIPTION OF THE INVENTION

Figure 2:
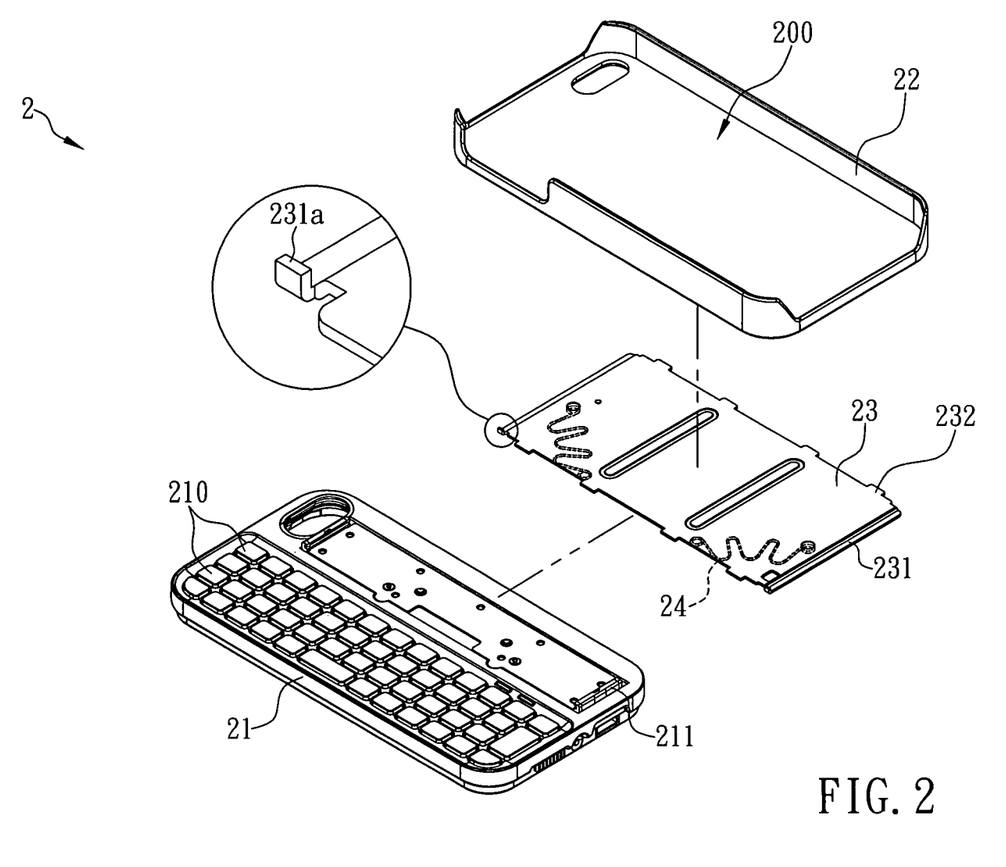
FIG. 2 is an exploded perspective view of a wireless input device according to a preferred embodiment of the present invention.
Figure 3:
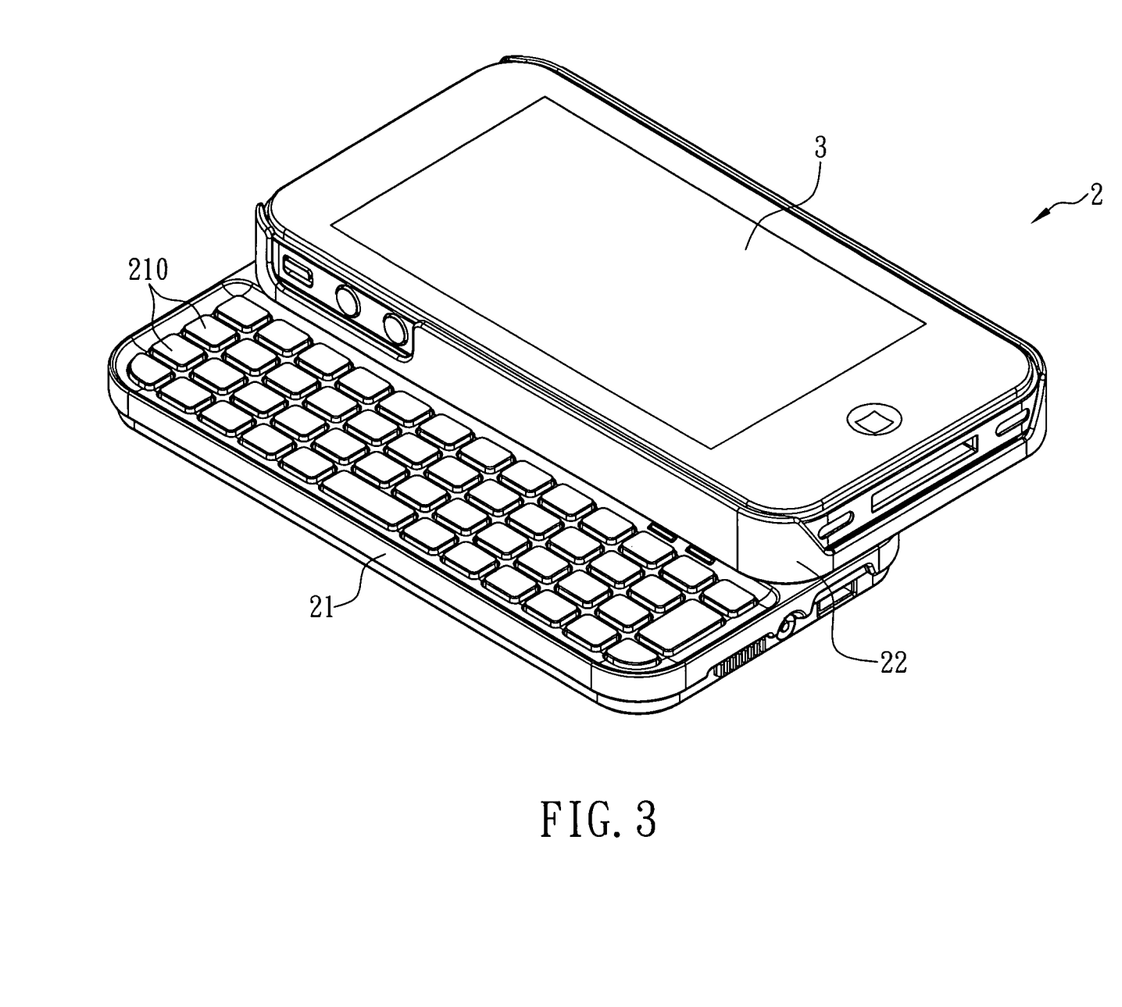
FIG. 3 is a perspective view showing the wireless input device of FIG. 2 in use.

The present invention provides a wireless input device applicable to and integrable with a mobile device. Referring to FIGS. 2 and 3 for a preferred embodiment of the present invention, a wireless input device 2 includes a wireless keyboard 21, a carrier 22, and a retracting plate 23. The wireless keyboard 21 is configured for connecting with a mobile device 3 in a wireless manner (e.g., via Bluetooth transmission). The wireless keyboard 21 has a plurality of keys 210 on the top surface and a first rail element 211 on each of two opposite lateral sides, wherein the first rail elements 211 are parallel to each other. The carrier 22 has a receiving cavity 200 on the top surface. The receiving cavity 200 corresponds in configuration to the mobile device 3, so that the mobile device 3 can be placed and secured in position in the receiving cavity 200, and integrated with the carrier 22 and protected from surface scratches. The retracting plate 23 has two second rail elements 231 provided at two opposite positions on the retracting plate 23 respectively. The second rail elements 231 correspond in configuration to the first rail elements 211 so as to be engaged therewith respectively and be positioned on the wireless keyboard 21. The retracting plate 23 can be movably embedded in the bottom surface of the carrier 22, thus allowing both the carrier 22 and the retracting plate 23 to be moved along the rail elements 211 and 231.

Figure 4:
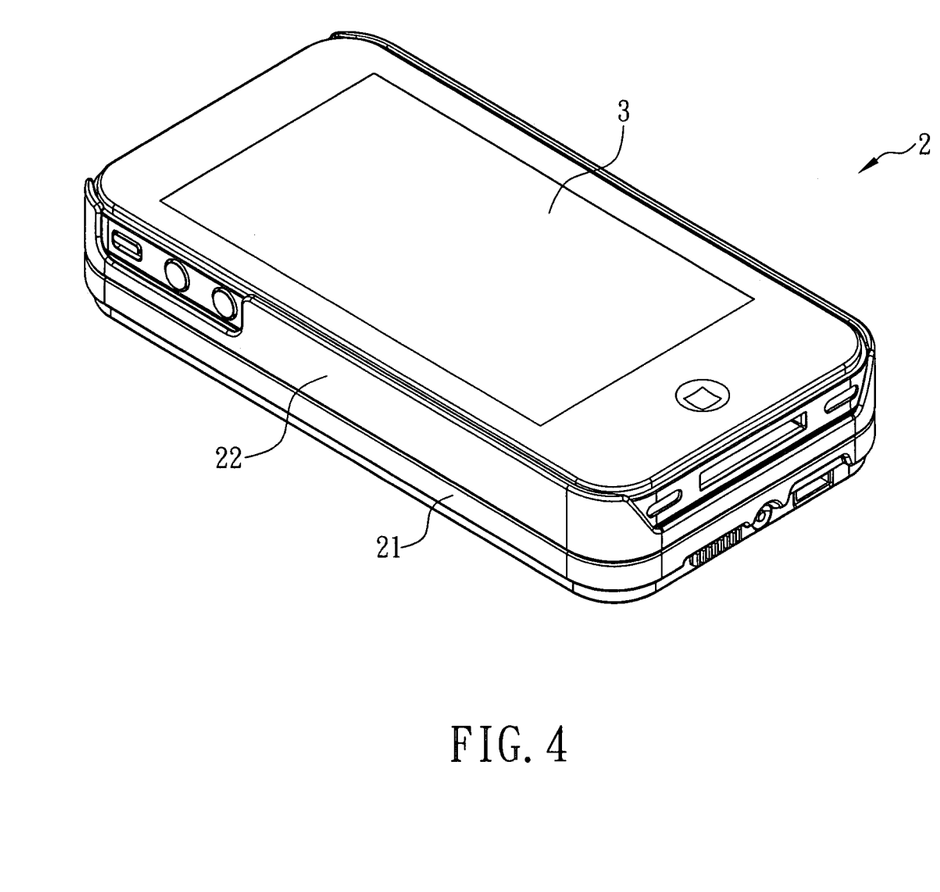
FIG. 4 is a perspective view showing the wireless input device of FIG. 2 in another state of use.

As shown in FIGS. 2 and 3, once the retracting plate 23 is embedded in the bottom surface of the carrier 22, the carrier 22 and the retracting plate 23 can be moved along the rail elements 211 and 231 toward first ends (i.e., the left ends in FIG. 2) thereof to cover the wireless keyboard 21 completely. The carrier 22 and the retracting plate 23 can also be moved along the rail elements 211 and 231 toward second ends (i.e., the right ends in FIG. 2) thereof, so that all the keys 210 of the wireless keyboard 21 are located to one side of the carrier 22 and exposed for being pressed. Therefore, once the mobile device 3 is positioned in the receiving cavity 200 and hence integrated with the wireless input device 2, the user only has to push the carrier 22 on one side, and the keys 210 of the wireless keyboard 21 will be exposed. When any of the keys 210 is subsequently pressed, the wireless keyboard 21 sends the command corresponding to the pressed key 210 wirelessly to the mobile device 3 to carry out the corresponding action (e.g., text input, program execution, etc.). When the user has completed the input of commands, and the wireless keyboard 21 is no longer in use, the carrier 22 can be pushed toward the wireless keyboard 21 so as for the carrier 22 to cover the wireless keyboard 21 completely, as shown in FIG. 4. By doing so, the wireless input device 2 is also folded up to match the mobile device 3 in shape. In order to reduce the overall size of the assembly, the wireless keyboard 21 and the retracting plate 23 can be detached from the bottom surface of the carrier 22, so the carrier 22 alone serves as a protective cover for the mobile device 3. Meanwhile, the wireless keyboard 21 and the retracting plate 23 can be carried around by the user. Thus, whenever the wireless keyboard 21 is needed, the wireless keyboard 21 and the retracting plate 23 can be taken out and embedded into the bottom surface of the carrier 22 to facilitate the input of commands.

Figure 5:
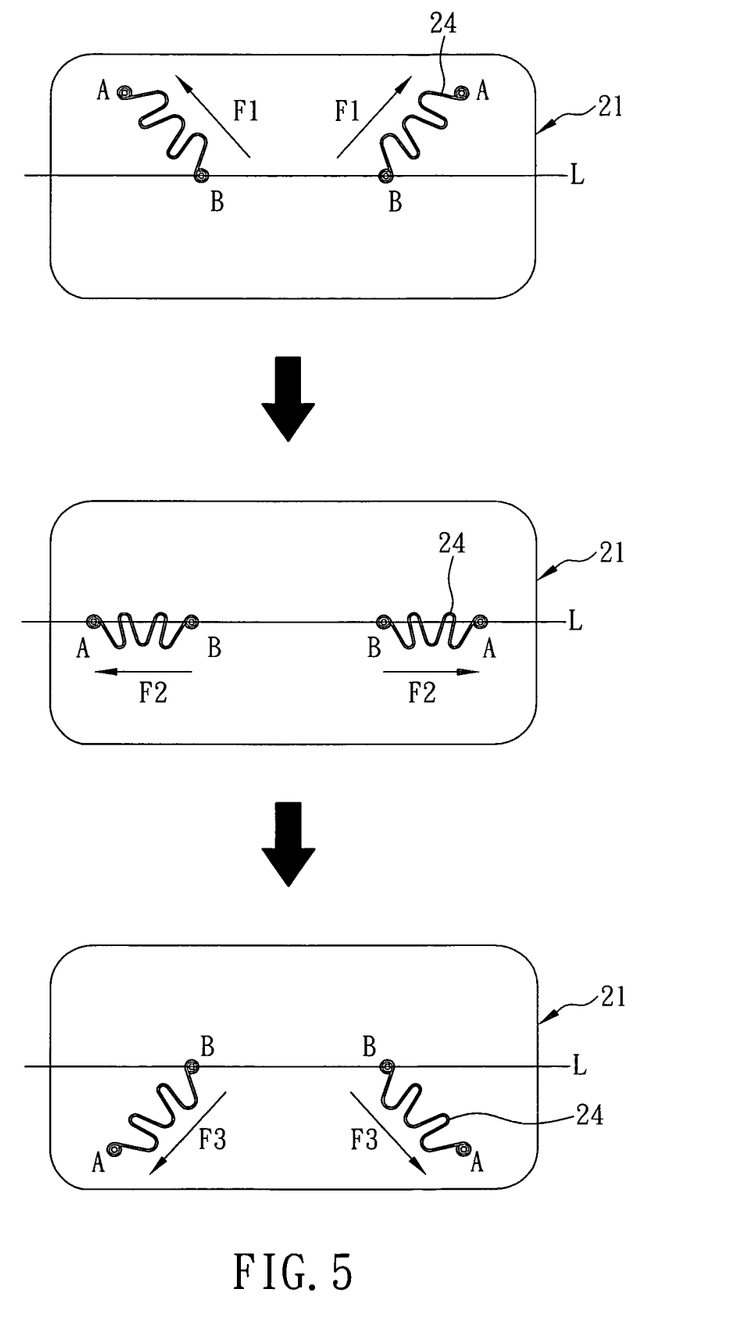
FIG. 5 is a schematic drawing showing the different states of the resilient elements of a retracting plate in the wireless input device of FIG. 2.

Referring to FIGS. 2 and 5, the retracting plate 23 in this preferred embodiment is further provided with at least one resilient element 24. Each resilient element 24 has an end A connected to the bottom surface of the retracting plate 23 and an opposite end B fixed to the top surface of the wireless keyboard 21 at a position away from the keys 210. When the wireless keyboard 21 is completely covered by the carrier 22, the end A of each resilient element 24 applies a retracting force to the retracting plate 23 and thereby keeps the carrier 22 in a state in which it covers the wireless keyboard 21 entirely (hereinafter referred to as the folded state). Once the carrier 22 is pushed in such a way that all the keys 210 of the wireless keyboard 21 are located to one side of the carrier 22 and therefore exposed, the end A of each resilient element 24 applies an opening force to the retracting plate 23 to keep the carrier 22 in a state in which all the keys 210 are located to one side of the carrier 22 and exposed (hereinafter referred to as the opened state). The operation of the resilient elements 24 is described below in further detail with reference to FIG. 5, which schematically shows how the wireless input device 2 is switched from the opened state to the folded state. It should be noted that some of the aforesaid components are omitted in FIG. 5 to facilitate explanation of the working principle of the resilient elements 24.

(1) Opened state: Referring to the top drawing in FIG. 5, the wireless input device 2 is depicted as in the opened state, in which the end A of each resilient element 24 applies an opening force F1 to the retracting plate 23 while the end B of each resilient element 24 is fixedly provided on the top surface of the wireless keyboard 21 and corresponds in position to a horizontal line L. As the opening forces F1 drive both the carrier 22 and the retracting plate 23 away from the horizontal line L, all the keys 210 of the wireless keyboard 21 are exposed from one side of the carrier 22 (see FIG. 3).

(2) Critical state: When the carrier 22 in the aforesaid opened state is pushed toward the wireless keyboard 21 such that the end A of each resilient element 24 is brought close to the corresponding end B and reaches the horizontal line L where the corresponding end B lies, as shown in the middle drawing in FIG. 5, the resilient elements 24 enter a critical state. In this state, the end A of each resilient element 24 applies a horizontal critical force F2 to the retracting plate 23. Now that the second rail elements 231 are engaged with the first rail elements 211, the critical forces F2 cannot move the retracting plate 23 horizontally, and the resilient elements 24 remain in the critical state as a result. If, at this moment, the ends A of the resilient elements 24 are pushed across the horizontal line L toward the wireless keyboard 21, the directions of the critical forces F2 will be changed toward the keys 210 (see the bottom drawing in FIG. 5), thus turning the critical forces F2 into retracting forces F3.

(3) Folded state: The retracting forces F3 applied by the ends A of the resilient elements 24 to the retracting plate 23 cause both the retracting plate 23 and the carrier 22 to move toward the keys 210 and, in the end, cover the wireless keyboard 21 entirely. The retracting forces F3 also keep the wireless input device 2 in the folded state (see FIG. 4).

By virtue of the resilient elements 24, the wireless input device 2 is switchable between the opened state and the folded state. In particular, as soon as the ends A of the resilient elements 24 cross the horizontal line L, the resilient elements 24 apply the retracting forces F3 or the opening forces F1 to the retracting plate 23 to move the carrier 22 to a position where the wireless keyboard 21 is completely covered by the carrier 22 or a position where all the keys 210 of the wireless keyboard 21 are located to one side of the carrier 22 and exposed. The opening forces F1 ensure that the carrier 22 will be firmly positioned while the user is inputting commands, even if the carrier 22 is subjected to an external force such as the weight of the mobile device 3 itself or a pushing force applied inadvertently by the user. On the other hand, once the wireless input device 2 is in the folded state, the retracting forces F3 ensure that the carrier 22 will not slide along the rail elements 211 and 231; consequently, the wireless input device 2 is prevented from entering the opened state by accident.

Figure 6:
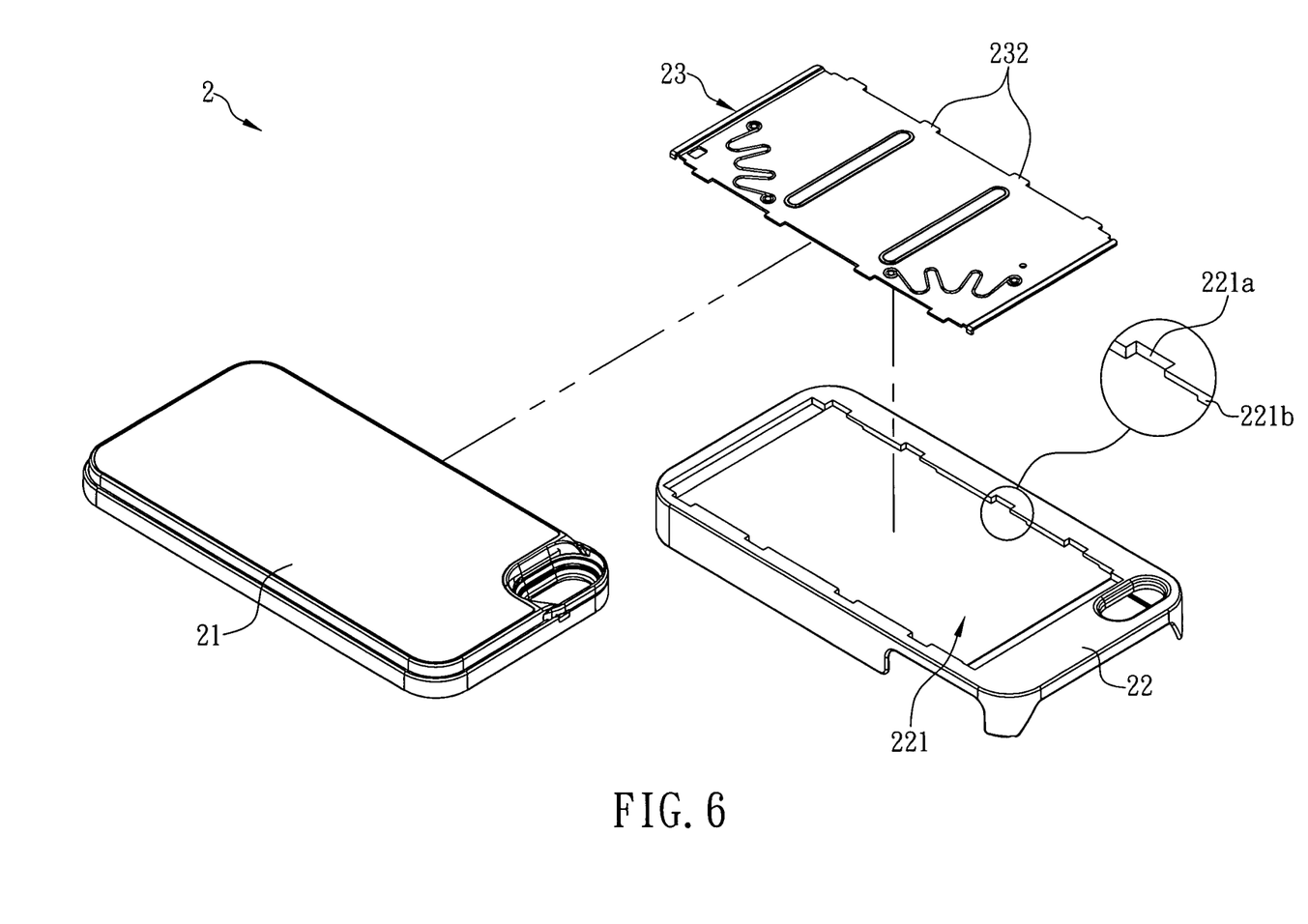
FIG. 6 is another exploded perspective view of the wireless input device of FIG. 2.

With reference to FIGS. 2, 3, and 6, in the preferred embodiment of the present invention, the retracting plate 23 is peripherally provided with at least one projection 232, and the bottom surface of the carrier 22 is concavely provided with a recessed portion 221, wherein the recessed portion 221 corresponds in configuration to the retracting plate 23 and serves to receive the retracting plate 23. In addition, the recessed portion 221 is formed with at least one positioning slot 221a corresponding in position to the at least one projection 232 respectively. As shown in the drawings, the positioning slots 221a correspond in configuration to the projections 232, and the projections 232 can pass through the corresponding positioning slots 221a respectively. Moreover, the recessed portion 221 has an inner surface that is formed with an engaging portion 221b adjacent to each positioning slot 221a. The user can place the retracting plate 23 into the recessed portion 221 when the projections 232 are aligned with the corresponding positioning slots 221a respectively. Then, by pushing, or shifting, the retracting plate 23 within the recessed portion 221, the projections 232 are driven away from the corresponding positioning slots 221a and engaged with the corresponding engaging portions 221b, and the retracting plate 23 is thus embedded in the bottom surface of the carrier 22. When the wireless keyboard 21 is no longer in use, the user only has to push the retracting plate 23 in the opposite direction, causing the projections 232 to disengage from the corresponding engaging portions 221b and move toward the corresponding positioning slots 221a, and the retracting plate 23 can be rapidly removed from the recessed portion 221. This allows the mobile device 3 to be connected to the carrier 22 alone while being carried around. When it is later desired to input commands into the mobile device 3, the user can embed the retracting plate 23 into the recessed portion 221 again, so the wireless input device 2 and the mobile device 3 are readily connected together for use.

Referring to FIG. 2, the first end (i.e., the left end in FIG. 2) of each second rail element 231 is further provided with a stopper 231a, and each stopper 231a corresponds in configuration to the first end (i.e., the left end in FIG. 2) of the corresponding first rail element 211. When the retracting plate 23 is embedded in the recessed portion 221, and the carrier 22 has been pushed to the position where all the keys 210 of the wireless keyboard 21 are located to one side of the carrier 22 and therefore exposed, the stoppers 231a are pressed against the first ends of the first rail elements 221 respectively to secure the carrier 22 at the position where all the keys 210 of the wireless keyboard 21 are located to one side of the carrier 22 and exposed. When the carrier 22 and the retracting plate 23 have moved along the rail elements 211 and 231 to the position where the wireless keyboard 21 is fully covered, the second end (the right end in FIG. 2) of each first rail element 211 is pressed against the inner wall of the recessed portion 221 to fix the wireless input device 2 in the opened state. Thus, the wireless input device 2 can be switched between the folded state and the opened state more smoothly and more precisely.

While the invention herein disclosed has been described by means of specific embodiments, numerous modifications and variations could be made thereto by those skilled in the art without departing from the scope of the invention set forth in the claims.

What is claimed is:

1. A wireless input device integrable with a mobile device, the wireless input device being configured for use with the mobile device and comprising:
    a wireless keyboard configured for making wireless connection with the mobile device, the wireless keyboard having a top surface provided with a plurality of keys, the wireless keyboard further having two opposite sides each provided with a first rail element, wherein the first rail elements are parallel to each other;
    a carrier having a top surface defining a receiving cavity, the receiving cavity corresponding in configuration to the mobile device so as for the mobile device to be placed and secured in position in the receiving cavity;
    a retracting plate provided with a second rail element at each of two opposite positions on the retracting plate, the second rail elements corresponding in configuration to the first rail elements and being engaged therewith respectively to position the retracting plate on the wireless keyboard, wherein the retracting plate can be movably embedded in a bottom surface of the carrier so that both the carrier and the retracting plate are movable along the rail elements to a position where the wireless keyboard is completely covered by the carrier or a position where all the keys of the wireless keyboard are exposed outside the carrier;
    the retracting plate is peripherally provided with at least a projection, and the bottom surface of the carrier is concavely provided with a recessed portion, the recessed portion corresponding in configuration to the retracting plate so as to receive the retracting plate, the recessed portion having a positioning slot corresponding in position to each said projection so that the retracting plate when positioned in the recessed portion is movable therein to drive each said projection away from a corresponding said positioning slot and into engagement with an inner wall of the recessed portion and the inner wall of the recessed portion is provided with an engaging portion adjacent to each said positioning slot; and
    wherein the retracting plate is further provided with at least a resilient element, each said resilient element having a first end connected to the retracting plate and a second end fixed to the wireless keyboard at a position away from the keys such that the first end of each said resilient element can apply a retracting force to the retracting plate to keep the carrier in a state in which the carrier covers the wireless keyboard completely or, when the carrier has been pushed to a position where all the keys are located to one side of the carrier and therefore exposed, can apply an opening force to the retracing plate to keep the carrier in a state in which the keys are exposed outside the carrier.

2. The wireless input device of claim 1, wherein each said second rail element has an end provided with a stopper corresponding in configuration to an end of a corresponding said first rail element so that when the carrier has been pushed to the position where all the keys of the wireless keyboard are exposed outside the carrier, the stoppers are pressed against the ends of the first rail elements respectively.

* * * * *